E. C. B. JUDD.
CLOSET SEAT HINGE.
APPLICATION FILED JUNE 8, 1915.
1,194,391.
Patented Aug. 15, 1916.
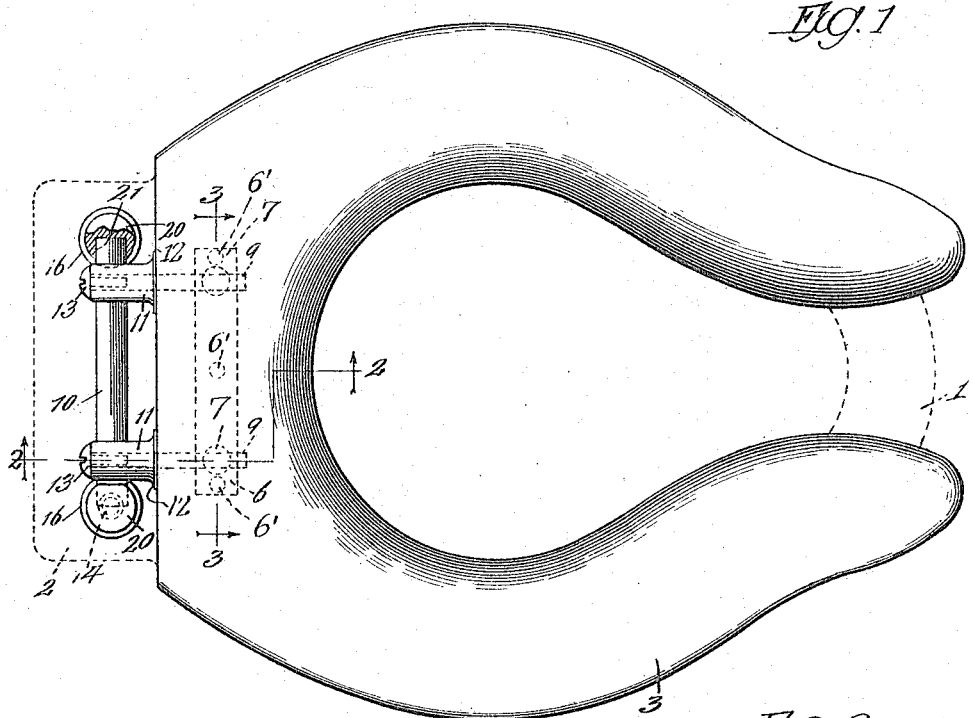
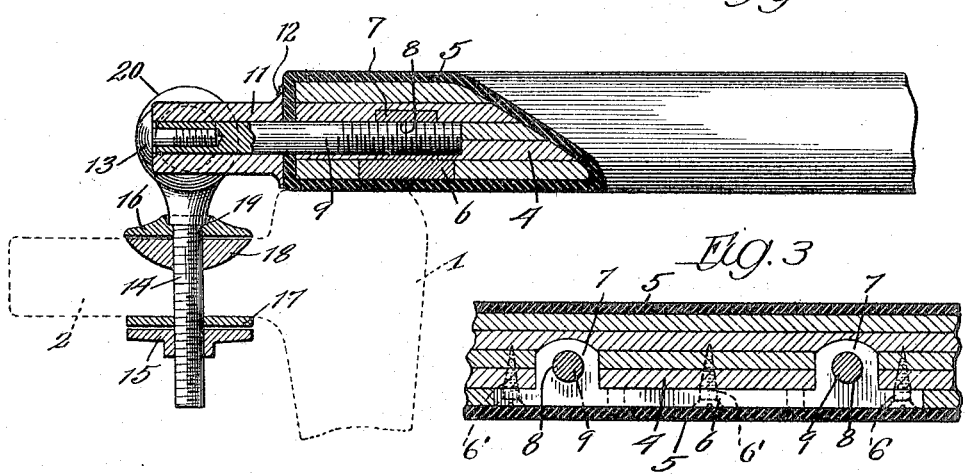
Witnesses:
Inventor:
Earldley C. B. Judd

UNITED STATES PATENT OFFICE.

EARLDLEY C. B. JUDD, OF CHICAGO, ILLINOIS, ASSIGNOR TO THE BRUNSWICK-BALKE-COLLENDER COMPANY, OF CHICAGO, ILLINOIS, A CORPORATION OF DELAWARE.

CLOSET-SEAT HINGE.

1,194,391.  Specification of Letters Patent.  Patented Aug. 15, 1916.

Application filed June 8, 1915. Serial No. 32,840.

*To all whom it may concern:*

Be it known that I, EARLDLEY C. B. JUDD, a subject of the King of Great Britain, residing at Chicago, in the county of Cook and State of Illinois, have invented certain new and useful Improvements in Closet-Seat Hinges, of which the following is a specification.

This invention relates to hinges for water closet seats having novel means for securing the seat thereto.

Heretofore hinges having been secured to closet seats by means of screws passing through a plate on the under side of the seat and into the body of the seat. While this is a cheap and fairly satisfactory arrangement with wood seats previously in common use, the introduction of molded hard rubber seats makes it possible to provide a much stronger and better hinge presenting a neater appearance than previously known hinges.

It is the object of my invention to provide a hinge of strong construction and neat appearance, which may be easily applied to and is particularly adapted for use with molded seats.

Other objects and advantages of my invention will be apparent as it is better understood by reference to the following specification when read in connection with the accompanying drawing in which—

Figure 1 is a plan view of a closet seat provided with my improved hinge; Fig. 2 is a vertical section on the line 2—2 of Fig. 1, and Fig. 3 is a vertical section on the line 3—3 of Fig. 1.

Referring to the drawings, 1 indicates a closet bowl provided with a rearwardly extending flange 2.

3 indicates a seat which may be of any suitable conformation but which is preferably constructed of a core 4 comprising a plurality of layers of wood, forming a laminated structure, covered with a veneer 5 of hard rubber vulcanized to the core 4. While the core 4 is described as of a laminated wood construction it may obviously consist of other material of relatively low cost, such as inexpensive vulcanized rubber compound consisting largely of reclaimed rubber, the invention in the present instance residing in the hinge and the means for securing it to the seat.

Embedded within the core 4 is a transversely extending member 6, preferably of metal, secured to the core 4 by screws 6' and having upstanding lugs 7 provided with threaded openings 8. A pair of bolts 9, threadedly engage the openings 8 and extend rearwardly from the seat. A transverse member 10 is provided with a pair of extensions 11, bored to receive the bolts 9, the ends of the extensions 11 being preferably flanged at 12 to engage the rear edge of the seat 3. Screws 13 are disposed in the ends of the bolts 9 with their heads engaging the transverse member 10, so that the flanges 12 are tightly held in coöperative relation with the seat 3.

A pair of bolts 14 are disposed through suitable openings in the flange 2 and held in proper relation thereto by nuts 15 and 16 threadedly engaging the bolt 14, washers 17 and 18 being disposed between the nuts 15 and 16 and the flange 2. As will be readily understood, the bolts 14 are adjustable vertically by manipulating the nuts 15 and 16. The nut 16 is counter-sunk at 19, so that a certain amount of adjustment is allowed without marring the appearance of the hinge. The bolts 14 are provided with spherical heads 20 having openings 21 therein, in which the ends of the transverse member 10 are disposed, providing a pivotal connection between the bolts 14 and the member 10.

By manipulating the bolts 9, the outer ends thereof may be adjusted with respect to the rear of the seat 3 and inasmuch as vertical adjustment of the bolts 14 is provided for by the nuts 15 and 16 it will be readily understood that the seat 3 may be readily adjusted to properly coöperate with the bowl 1. The transverse member 6 materially stiffens the structure of the seat 3, particularly with regard to the strains to which it is liable to be subjected in operating the hinge. The hinge is of rigid construction and it is practically impossible to dislodge it from the seat during ordinary and reasonable use as frequently happens with hinges secured simply by means of screws.

While I have shown and described the invention as embodied in a closet seat having a laminated core covered with a veneer of hard rubber vulcanized to the core I reserve the right to embody the invention in seats of other construction, as for example, laminated or solid wood seats. Furthermore, while my invention is shown in connection with the seat *per se* it is to be understood that it is equally applicable to the cover which forms a part of the seat in the broader sense of the word and that the word "seat" as used in the accompanying claims is intended to have the broader meaning so that the application of the invention is not limited to the specific disclosure in the drawing.

It will be apparent that various changes may be made in the form, construction and arrangement of the parts without departing from the spirit and scope of the invention, or sacrificing any of its material advantages, the form hereinafter described being merely a preferred embodiment thereof.

I claim:

1. The combination of a water closet seat and a hinge therefor, said seat comprising a core of laminated wood and a veneer of hard vulcanized rubber thereon, and a plate embedded in the core with one side thereof flush with the bottom of the core and covered by the veneer on the bottom of the seat, said plate having upwardly directed lugs on its upper side terminating below the top of the core, there being threaded openings in the lugs and registering openings in the seat to receive parts of said hinge.

2. The combination of a water closet seat and a hinge therefor, said seat comprising a core of laminated wood and a veneer of hard vulcanized rubber thereon, and a plate embedded in the core with one side thereof flush with the bottom of the core and covered by the veneer on the bottom of the seat, said plate having upwardly directed lugs on its upper side located wholly within the edges of the plate and terminating below the top of the core, there being threaded openings in the lugs and registering openings in the seat to receive parts of said hinge.

3. A water closet seat hinge, comprising a member adapted to be embedded within the seat and provided with threaded openings, a pair of bolts threadedly engaging said openings and extending rearwardly from said seat, a pair of bolts having means thereon for adjustably securing them to the closet bowl and provided with heads, a transversely extending hinge member pivotally mounted in said heads, and screws threadedly engaging said first-mentioned bolts to secure said hinge member thereto.

EARLDLEY C. B. JUDD.

Witnesses:
Wm. O. Belt,
W. T. Westerberg.